United States Patent
Minshall et al.

(10) Patent No.: US 7,496,795 B2
(45) Date of Patent: Feb. 24, 2009

(54) METHOD, SYSTEM, AND COMPUTER PROGRAM PRODUCT FOR LIGHT WEIGHT MEMORY LEAK DETECTION

(75) Inventors: Robbie J. Minshall, Chapel Hill, NC (US); Ruth E. Willenborg, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 585 days.

(21) Appl. No.: 11/143,032

(22) Filed: Jun. 2, 2005

(65) Prior Publication Data
US 2006/0277440 A1    Dec. 7, 2006

(51) Int. Cl.
*G06F 11/00*    (2006.01)
(52) U.S. Cl. .......................................... 714/38; 707/206
(58) Field of Classification Search .................... 714/48
See application file for complete search history.

(56) References Cited

U.S. PATENT DOCUMENTS

| | | | |
|---|---|---|---|
| 5,842,019 A * | 11/1998 | Kolawa et al. ............... | 717/130 |
| 6,115,782 A * | 9/2000 | Wolczko et al. ............. | 711/100 |
| 6,370,684 B1 * | 4/2002 | De Pauw et al. ............ | 717/124 |
| 6,560,773 B1 * | 5/2003 | Alexander et al. .......... | 717/128 |
| 6,597,907 B1 * | 7/2003 | Pruitt et al. .................. | 455/423 |
| 6,629,266 B1 * | 9/2003 | Harper et al. ................ | 714/38 |
| 6,658,652 B1 | 12/2003 | Alexander, III et al. | |
| 6,782,462 B2 * | 8/2004 | Marion et al. ............... | 711/170 |
| 7,234,080 B2 * | 6/2007 | Cirne et al. .................. | 714/38 |
| 7,398,369 B2 * | 7/2008 | Dickenson .................. | 711/170 |
| 2003/0061597 A1 * | 3/2003 | Curtis et al. ................. | 717/128 |
| 2004/0133895 A1 | 7/2004 | Dahlstedt et al. | |
| 2004/0172579 A1 * | 9/2004 | Fu ................................ | 714/47 |
| 2005/0204342 A1 * | 9/2005 | Broussard .................... | 717/124 |
| 2006/0173877 A1 * | 8/2006 | Findeisen et al. ........... | 707/101 |
| 2008/0155548 A1 * | 6/2008 | Dettinger et al. ............ | 718/102 |

FOREIGN PATENT DOCUMENTS

JP    2004005305 A    1/2004

OTHER PUBLICATIONS

Manuel Serrano and Hans-J Boehm, Understanding Memory Allocation of Scheme Programming, ACM SIGPLAN Notices ☐☐vol. 35 , Issue 9 Sep. 2000.*
Martin Hirzel, Amer Diwan, and Antony Hosking,On the Usefulness of Liveness for Garbage Collection and Leak Detection, Monday, Jan. 1, 2001 , Springer Berlin / Heidelberg ,vol. 2072/2001.*

* cited by examiner

*Primary Examiner*—Gabriel L Chu
(74) *Attorney, Agent, or Firm*—A. Bruce Clay; Hoffman Warnick LLC

(57) ABSTRACT

The present invention provides a method, system, and computer program product for light weight memory leak detection. A method in accordance with an embodiment of the present invention comprises: obtaining raw free memory statistics; approximating free memory after garbage collection from the raw free memory statistics; and analyzing the approximated free memory after garbage collection to identify a potential memory leak. A method in accordance with another embodiment of the present invention comprises the steps of: obtaining raw free memory statistics; generating a vector of memory leak indicators from the raw free memory statistics; comparing the vector of memory leak indicators against a plurality of vectors of the same memory leak indicators for known memory leak scenarios; and identifying a potential memory leak based on the comparison.

14 Claims, 5 Drawing Sheets

METHOD, SYSTEM, AND COMPUTER PROGRAM PRODUCT FOR LIGHT WEIGHT MEMORY LEAK DETECTION

BACKGROUND OF THE INVENTION

1. Field of the Invention

The present invention generally relates to memory activity. More particularly, the present invention provides a method, system, and computer program product for light weight memory leak detection.

2. Related Art

Memory leaks and memory misuse (e.g., fragmented heap) are very common within Java 2 Platform Enterprise Edition (J2EE) applications, and will often cause process failures and will always cause poor performance. Current solutions look at heap dumps or verbose garbage collection information in order to find memory that is not being used or reclaimed properly. Unfortunately, these solutions are very expensive, processing intensive, and usually operate on the assumption that a memory leak is already known to exist. Often, however, memory leaks are not detected until the problem is critical (e.g., an application has passed all system tests, was put in production, and has crashed for an unknown reason) and cannot be resolved cleanly. Further, it is often difficult to reproduce a memory leak that has been deemed to have caused a production failure in a test environment.

Verbose garbage collection statistics are often charted in order to determine if a memory leak was the cause of a failure. If the free memory after a garbage collection cycle is consistently decreasing, then there is a high chance of a memory leak. FIG. 1 depicts an illustrative chart 10 of free memory after a garbage collection cycle in an application with a memory leak running on a server. Although the leak is very obvious to the eye, a user would not have been aware of the memory leak until after the server crashed, unless the user was actively monitoring the data.

SUMMARY OF THE INVENTION

In general, the present invention provides a method, system, and computer program product for light weight memory leak detection. In particular, the present invention provides early detection of suspicious memory activity in test and production using raw free memory statistics available by default during the running of a J2EE application. A memory leak advisor is used to collect and analyze the raw free memory statistics to detect memory leaks. The memory leak advisor is configured to run in the same Java Virtual Machine (JVM) as the application with minimal processing overhead. In one embodiment of the present invention, the raw free memory statistics are used to approximate the free memory after a garbage collection cycle, and memory leaks are indicated by downward trends in the raw free memory statistics. In another embodiment, the raw free memory statistics are used to build memory leak indicators that are compared using similarity metrics to memory leak indicators of known memory leak scenarios.

Upon detection of a memory leak, processing can be manually/automatically rerouted, and data (e.g., heap dumps) can be collected for off-line analysis. This allows memory leak detection to be enabled during production (unlike existing memory leak detection methodologies), and allows debugging to occur before the situation becomes critical (e.g., out of memory error) and while it is reproducible.

A first aspect of the present invention is directed to a method for memory leak detection, comprising: obtaining raw free memory statistics; approximating free memory after garbage collection from the raw free memory statistics; and analyzing the approximated free memory after garbage collection to identify a potential memory leak.

A second aspect of the present invention is directed to a system for memory leak detection, comprising: a system for obtaining raw free memory statistics; a system for approximating free memory after garbage collection from the raw free memory statistics; and a system for analyzing the approximated free memory after garbage collection to identify a potential memory leak.

A third aspect of the present invention is directed to a program product stored on a computer readable medium for memory leak detection, the computer readable medium comprising program code for performing the following steps: obtaining raw free memory statistics; approximating free memory after garbage collection from the raw free memory statistics; and analyzing the approximated free memory after garbage collection to identify a potential memory leak.

A fourth aspect of the present invention provides a method for deploying an application for memory leak detection, comprising: providing a computer infrastructure being operable to: obtain raw free memory statistics; approximate free memory after garbage collection from the raw free memory statistics; and analyze the approximated free memory after garbage collection to identify a potential memory leak.

A fifth aspect of the present invention provides computer software embodied in a propagated signal for memory leak detection, the computer software comprising instructions to cause a computer system to perform the following functions: obtain raw free memory statistics; approximate free memory after garbage collection from the raw free memory statistics; and analyze the approximated free memory after garbage collection to identify a potential memory leak.

A sixth aspect of the present invention provides a method for memory leak detection, comprising: obtaining raw free memory statistics; generating a vector of memory leak indicators from the raw free memory statistics; comparing the vector of memory leak indicators against a plurality of vectors of the same memory leak indicators for known memory leak scenarios; and identifying a potential memory leak based on the comparison.

BRIEF DESCRIPTION OF THE DRAWINGS

These and other features of this invention will be more readily understood from the following detailed description of the various aspects of the invention taken in conjunction with the accompanying drawings in which.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Figure 1:
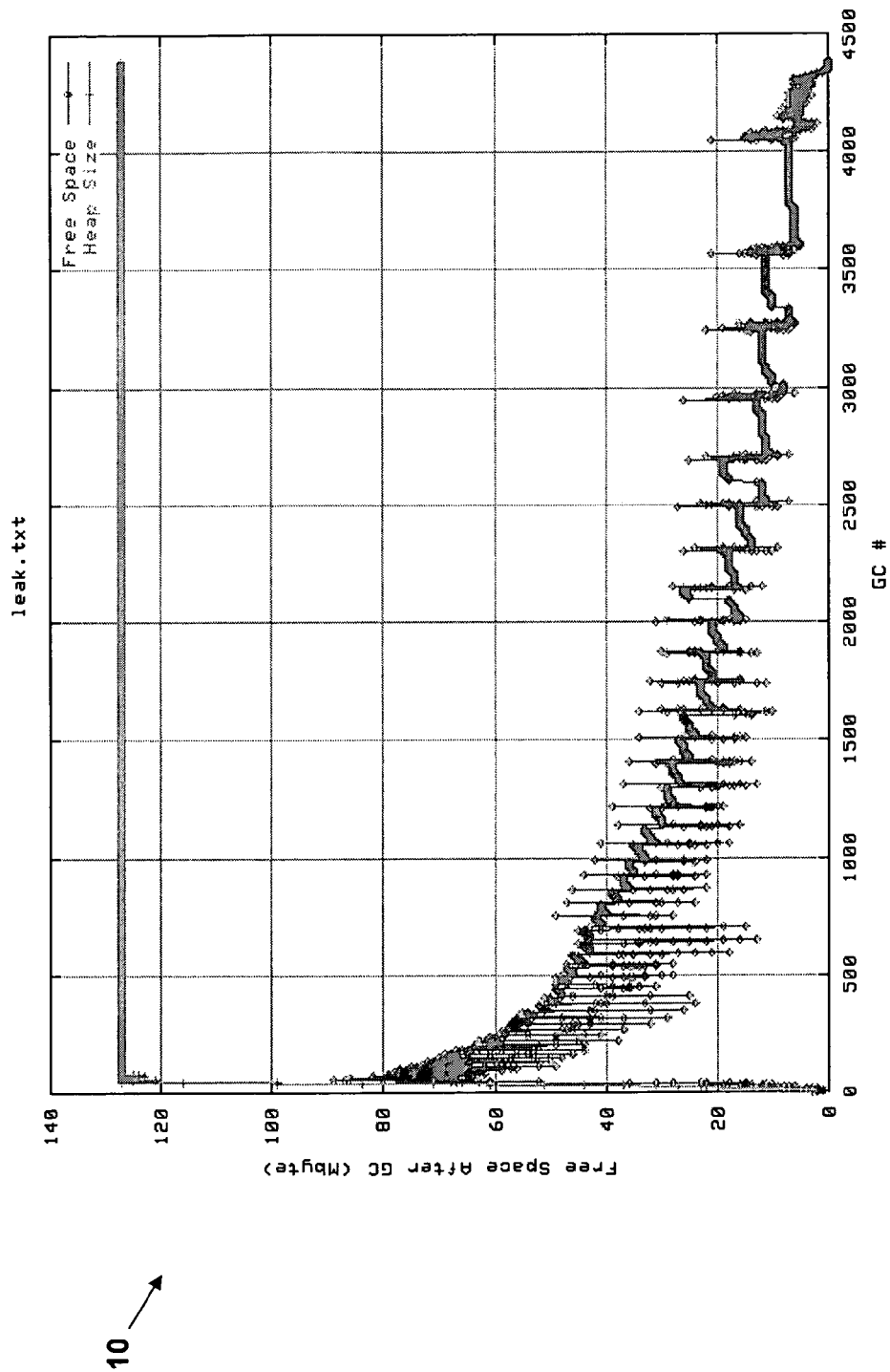
FIG. 1 depicts an illustrative chart of free memory after garbage collection in an application with a memory leak.
Figure 2:
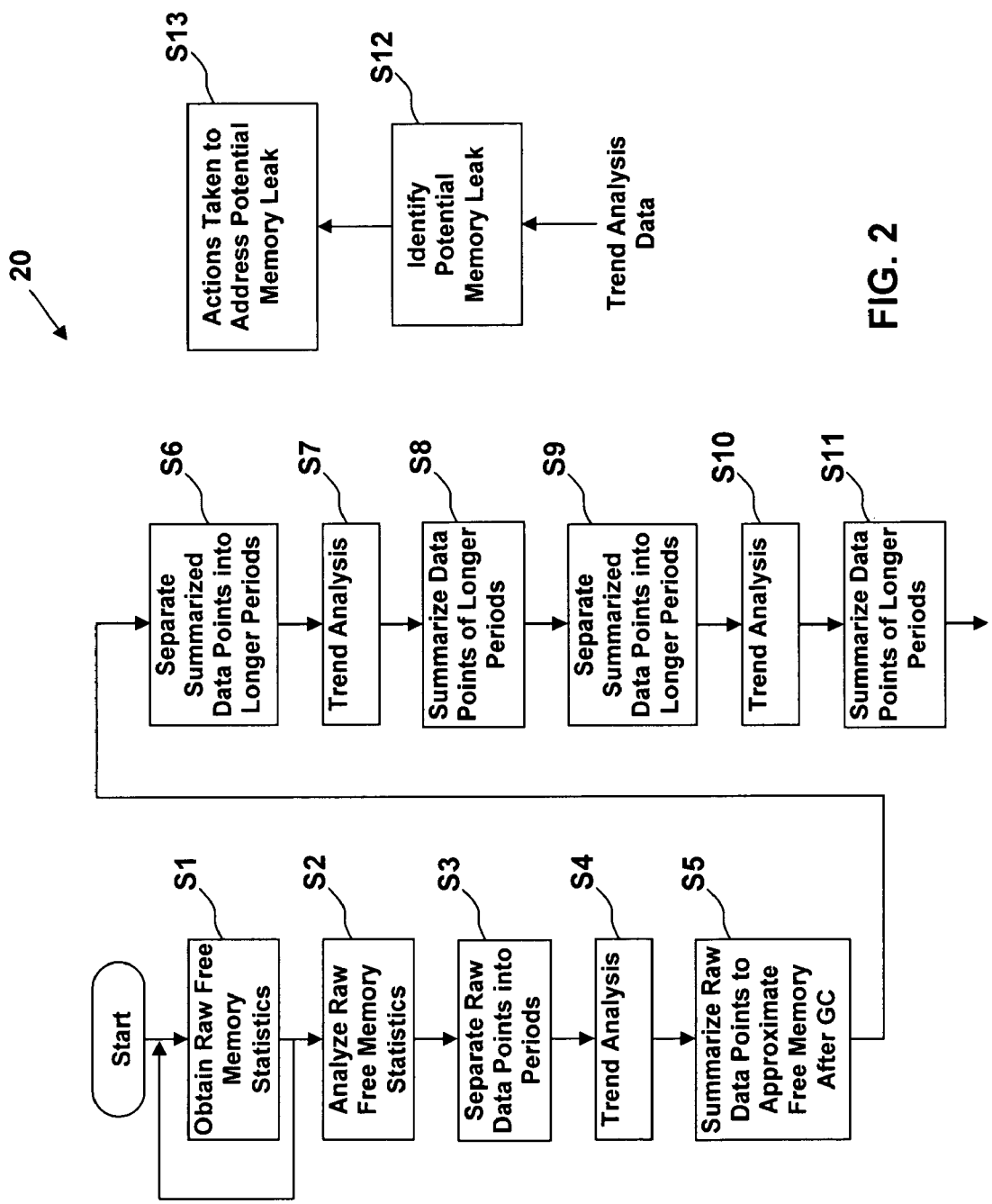
FIG. 2 depicts a flow diagram of a light weight memory leak detection method in accordance with an embodiment of the present invention.

A general flow diagram 20 of a light weight memory leak detection process in accordance with an embodiment of the present invention is depicted in FIG. 2. The flow diagram 20 is described with reference to the graphic representation 30 depicted in FIG. 3.

In step S1, raw free memory statistics 32 are obtained for an interval of time while an application is running. The raw free memory statistics 32 can comprise, for example, total free memory, total available memory, etc. Such raw free memory statistics 32 are available by default in the Java Virtual Machine (JVM) in which the application is running. The raw free memory statistics 32 can be obtained, for example, using known Java application programming interface (API) calls. In step S2, the raw free memory statistics 32 obtained in step S1 are analyzed (e.g., using standard deviation or other techniques) to determine when heap activity representative of garbage collection (e.g., satisfying a predetermined level of variance) is occurring. In step S3, the data points of the raw free memory statistics 32 are separated into periods 34 of time, where each period 34 includes possible garbage collection activity (as determined in step S2). In step S4, the data points of the raw free memory statistics 32 within each period 34 are analyzed for downward memory trends. In step S5, the data points of the raw free memory statistics 32 within each period 34 are summarized to a single data point 36 that approximates the free memory after garbage collection during that period 34. The data points of the raw free memory statistics 32 within each period 34 can be summarized in any suitable manner including, for example, mean, mode, min, max, etc. For example, if the data points of the raw free memory statistics 32 as a percentage during a period 34 were {33, 25, 18, 10, 8, 45, 30, 25}, then the highest percentage data point, i.e., "45," could be considered an approximation of the free memory after a garbage collection during that period 34. In FIG. 2, the maximum data point with each period 34 is used.

In step S6, the data points 36 are separated into longer periods 38 of time. In step S7, the data points 36 within each period 38 are analyzed for downward memory trends. In step S8, the data points 36 within each period 38 are summarized to a single data point that approximates the free memory after garbage collection during that period 38 of time. In step S9, the data points provided in step S8 are separated into longer periods 40 of time and, in step S10, these data points are analyzed for downward memory trends. A next higher level of summarization can then be performed in step S11. Although not shown, additional separating, analyzing, and summarizing steps can be performed as desired to allow for memory trend analysis of even longer periods of time. Based on the trend analysis performed in steps S4, S7, S10, etc., potential memory leaks are identified in step S12 by looking for a downward trend in the various analyzed data. In step S13, automatic and/or manual actions are taken to address a potential memory leak identified in step S12.

Memory leaks can be very fast or incredibly slow. To this extent, trend analysis is performed for both short and long periods of data. Further, to prevent the creation of memory leaks while performing memory leak detection, a very limited amount of data is stored. For example, a table can be used to store raw data points and data points representing short and long periods of data. Data points at the lowest level in the table represent raw data points, data points at a second level of the table represent summarized raw data points, data points at a third level of the table represent summarizations of the data points from the second level, and so on. After data points at any given level have been analyzed for memory trends and summarized, those data points are discarded according to configuration parameters. The summarized data point is then added to the next higher level and represents the data points within the period that was just analyzed. The result is that periods of various lengths are analyzed while raw and summarized data points that are no longer needed are discarded in order to keep the memory footprint of the present invention to a minimum.

Figure 4:
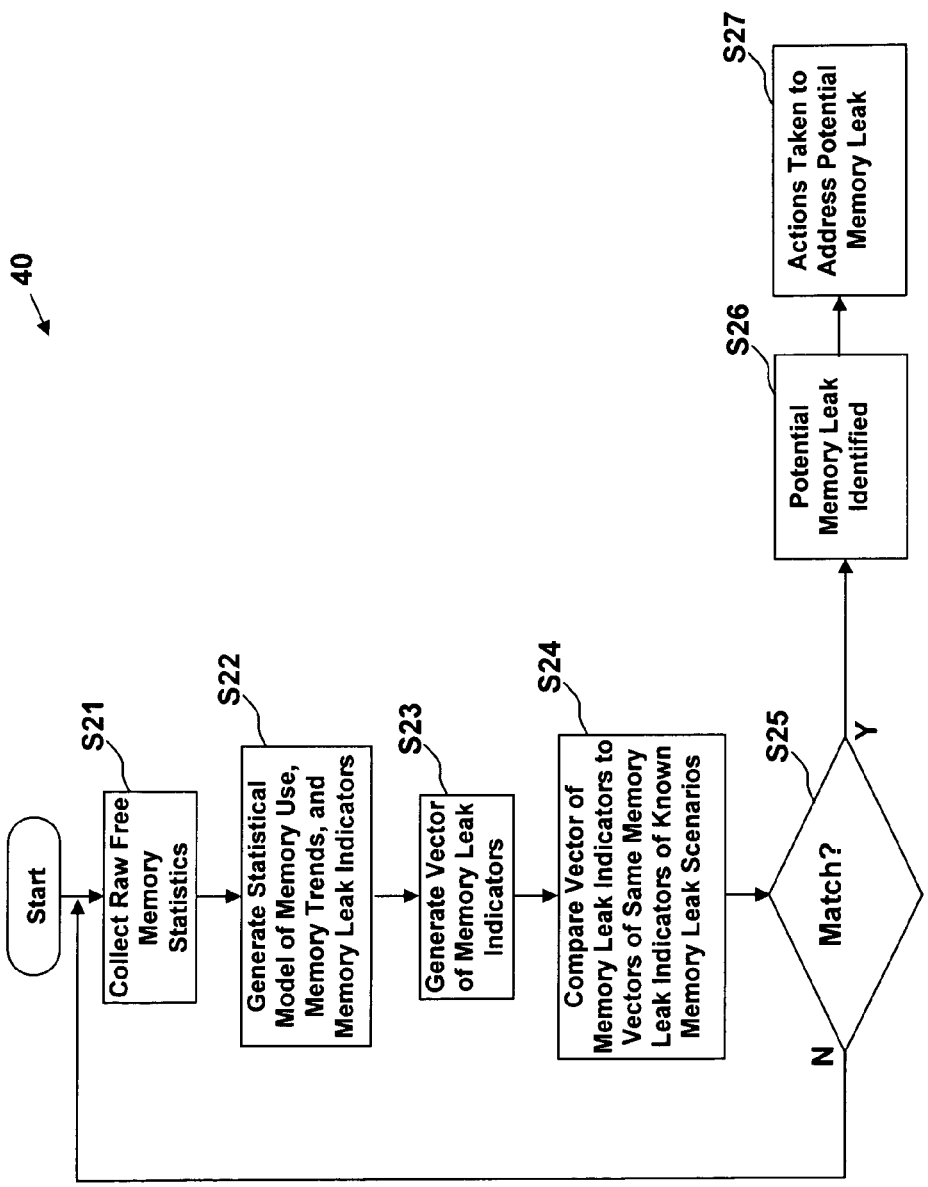
FIG. 4 depicts a flow diagram of a light weight memory leak detection method in accordance with another embodiment of the present invention.

A flow diagram 40 of a light weight memory leak detection method in accordance with another embodiment of the present invention is depicted in FIG. 4. In step S21, raw free memory statistics available by default are collected, and are used in step S22 to generate a statistical model of memory use, memory trends, and memory leak indicators. Examples of indicators that relate to memory usage include standard deviation of raw free memory, time in between approximated garbage collections, variance in time between garbage collections (if not stable is the time between decreasing?), variance in free memory after garbage collection (if not stable is the free memory decreasing?), and delta between high and low water marks for free memory. The raw free memory statistics can comprise, for example, total free memory, total available memory, total heap size, variance in heap size, load on application server, etc. As detailed above, such raw free memory statistics are available by default in the Java Virtual Machine (JVM) in which the application is running and can be obtained, for example, using known Java application programming interface (API) calls. In step S23, a vector of the memory leak indicators is generated. For example, each memory leak indicator can be represented as a weighted data point within a vector. The vector represents all of the indicators and their relative importance. For example, if there are two memory leak indicators (e.g., average free memory, and stdev of free memory) where average free memory is twice as important as stdev, this could be represented as follows: [{averageFreeMemory.2}, {stdev,1}].

In step S24, similarity metrics are then used to compare the vector of memory leak indicators generated in step S23 to a database of vectors of the same memory indicators for known memory leak scenarios. If a vector in the database is found in step S25 to be sufficiently similar to the vector of memory leak indicators generated in step S23, then the memory leak scenario associated with the matching vector potentially exists and is identified in step S26. In step S27, automatic and/or manual actions are taken to address the potential memory leak scenario identified in step S26. If a match is not found, however, then flow passes back to step S21. When a new memory leak scenario occurs, a new vector of memory leak indicators associated with the new memory leak scenario can be added to the database of vectors to update the database.

The present invention is light weight enough (e.g., minimal performance overhead) to be run during test and production and does not require a user to enable/use verbose garbage collection (verboseGC) or a Java Virtual Machine Profiling Interface (JMVPI). When a potential memory leak is detected in an application, the following actions can be taken:

(A) <automated+manual> User is automatically notified that a potential memory leak may exist via Java Management Extension (JMX) or other suitable notification mechanism. Such early notification of a potential memory leak is key for the user to maintain performance and functionality of the application/server, and allows the user to analyze the potential memory leak and/or take appropriate steps before the problem becomes critical. Such steps can include, for example, establishing/initiating a failover scenario (e.g., automatically switching to a standby server if the primary server fails or is temporarily shut down for servicing), and real-time debugging of the application as the memory leak is happening.

(B) <automated+manual> Work is rerouted from the server, heap dumps are taken, and work is rerouted back to the server. The heap dumps can then be analyzed by the user off-line using existing memory leak technologies.

(C) <manual> User can attach some existing technology to address/analyze the potential memory leak.

Figure 5:
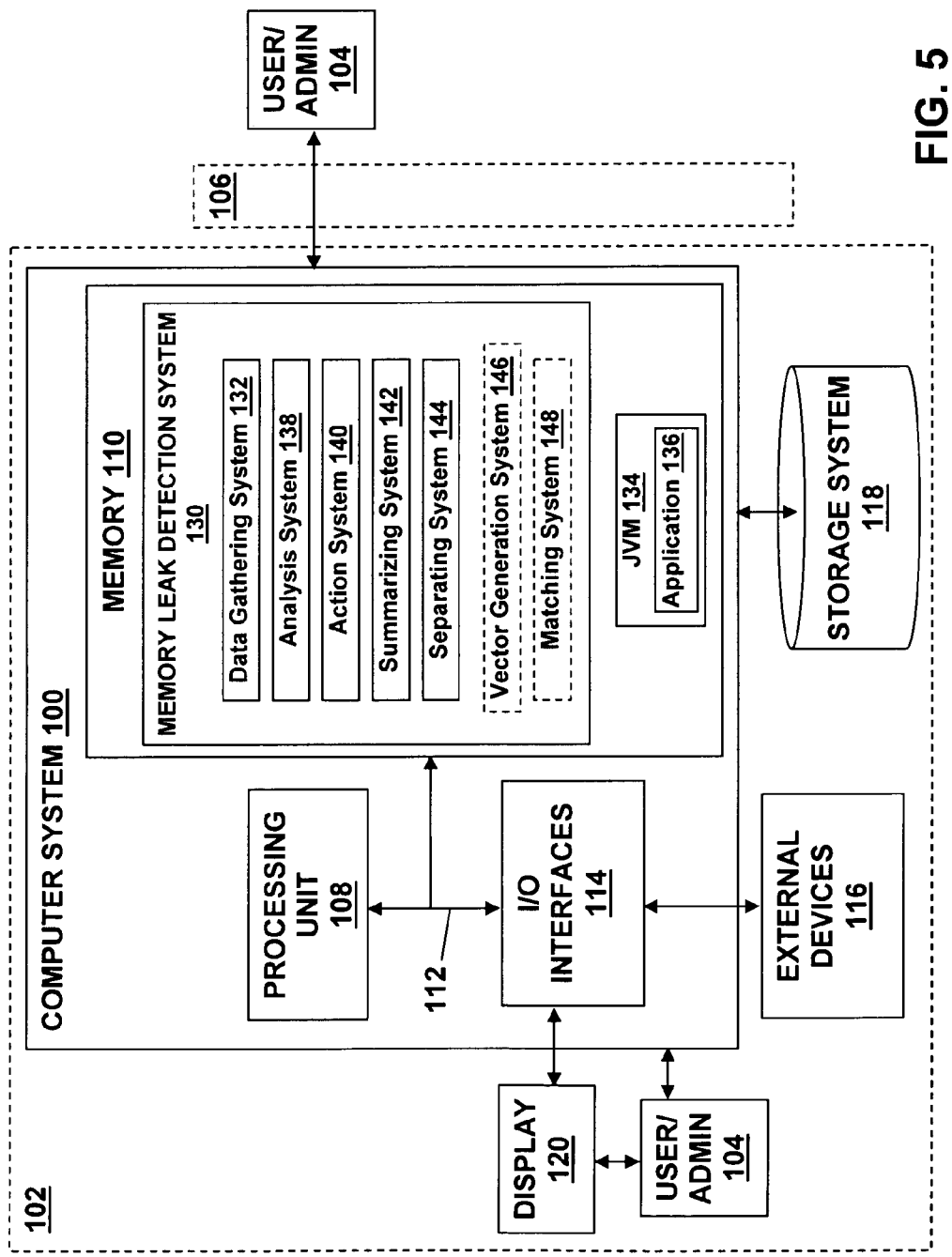
FIG. 5 depicts an illustrative computer system for implementing embodiments of the present invention.

A computer system 100 for light weight memory leak detection in accordance with an embodiment of the present invention is depicted in FIG. 5. Computer system 100 is provided in a computer infrastructure 102. Computer system 100 is intended to represent any type of computer system capable of carrying out the teachings of the present invention. For example, computer system 100 can be a laptop computer, a desktop computer, a workstation, a handheld device, a server, a cluster of computers, etc. In addition, as will be further described below, computer system 100 can be deployed and/or operated by a service provider that provides light weight memory leak detection in accordance with the present invention. It should be appreciated that a user/administrator 104 can access computer system 100 directly, or can operate a computer system that communicates with computer system 100 over a network 106 (e.g., the Internet, a wide area network (WAN), a local area network (LAN), a virtual private network (VPN), etc). In the case of the latter, communications between computer system 100 and a user-operated computer system can occur via any combination of various types of communications links. For example, the communication links can comprise addressable connections that can utilize any combination of wired and/or wireless transmission methods. Where communications occur via the Internet, connectivity can be provided by conventional TCP/IP sockets-based protocol, and an Internet service provider can be used to establish connectivity to the Internet.

Computer system 100 is shown including a processing unit 108, a memory 110, a bus 112, and input/output (I/O) interfaces 114. Further, computer system 100 is shown in communication with external devices/resources 116 and one or more storage systems 118. In general, processing unit 108 executes computer program code, such as memory leak detection system 130, that is stored in memory 110 and/or storage system(s) 118. While executing computer program code, processing unit 108 can read and/or write data, to/from memory 110, storage system(s) 118, and/or I/O interfaces 114. Bus 112 provides a communication link between each of the components in computer system 100. External devices/resources 116 can comprise any devices (e.g., keyboard, pointing device, display (e.g., display 120, printer, etc.) that enable a user to interact with computer system 100 and/or any devices (e.g., network card, modem, etc.) that enable computer system 100 to communicate with one or more other computing devices.

Computer infrastructure 102 is only illustrative of various types of computer infrastructures that can be used to implement the present invention. For example, in one embodiment, computer infrastructure 102 can comprise two or more computing devices (e.g., a server cluster) that communicate over a network (e.g., network 106) to perform the various process steps of the invention. Moreover, computer system 100 is only representative of the many types of computer systems that can be used in the practice of the present invention, each of which can include numerous combinations of hardware/software. For example, processing unit 108 can comprise a single processing unit, or can be distributed across one or more processing units in one or more locations, e.g., on a client and server. Similarly, memory 110 and/or storage system(s) 118 can comprise any combination of various types of data storage and/or transmission media that reside at one or more physical locations. Further, I/0 interfaces 114 can comprise any system for exchanging information with one or more external devices/resources 116. Still further, it is understood that one or more additional components (e.g., system software, communication systems, cache memory, etc.) not shown in FIG. 5 can be included in computer system 100. However, if computer system 100 comprises a handheld device or the like, it is understood that one or more external devices/resources 116 (e.g., a display) and/or one or more storage system(s) 118 can be contained within computer system 100, and not externally as shown.

Storage system(s) 118 can be any type of system (e.g., a database) capable of providing storage for information under the present invention. Such information can include, for example, raw free memory statistics, summarized data points (e.g., arranged in a table), memory leak indicators, vectors of memory leak indicators, etc. To this extent, storage system(s) 118 can include one or more storage devices, such as a magnetic disk drive or an optical disk drive. In another embodiment, storage system(s) 118 can include data distributed across, for example, a local area network (LAN), wide area network (WAN) or a storage area network (SAN) (not shown). Moreover, although not shown, computer systems operated by user/administrator 104 can contain computerized components similar to those described above with regard to computer system 100.

Shown in memory 110 (e.g., as a computer program product) is memory leak detection system 130 for providing light weight memory leak detection in accordance with embodiments of the present invention. The memory leak detection system 130 generally includes a data gathering system 132 for gathering raw free memory statistics available by default from a JVM 134 in which an application 136 is running, an analysis system 138 for analyzing the raw free memory statistics or data derived from the raw free memory statistics (e.g., to provide trend analysis, statistical models of memory use, memory leak indicators, etc.), and an action system 140 for notifying a user of potential memory leaks and for taking automatic actions in response to potential memory leaks.

Figure 3:
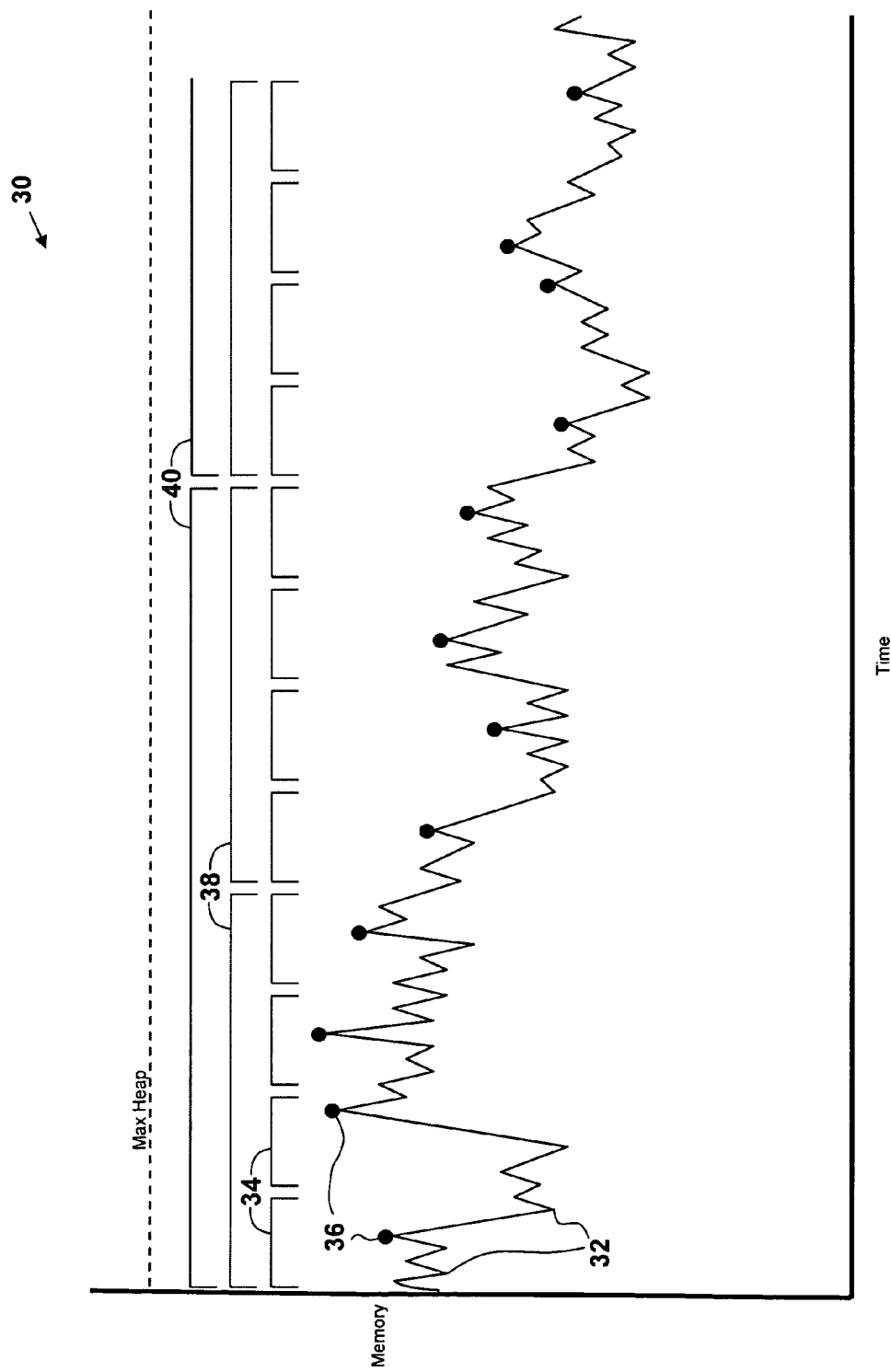
FIG. 3 depicts a graphic representation of the light weight memory leak detection method outlined in the flow diagram of FIG. 2.

To provide the embodiment of the present invention described with regard to FIGS. 2 and 3, the memory leak detection system 130 further includes a summarizing system 142 for summarizing the raw free memory statistics (e.g., to approximate free memory after garbage collection) and other previously summarized data based on predetermined criteria, and a separation system 144 for separating the raw free memory statistics and summarized data into periods. This data is provided to analysis system 138 for trend analysis to identity potential memory leaks.

To provide the embodiment of the present invention described with regard to FIG. 4, the memory leak detection system 130 further includes (as shown in phantom) a vector generation system 146 for generating a vector of memory leak indicators, and a matching system 148 for comparing the vector of memory leak indicators to vectors of memory leak indicators for known memory leak scenarios to identify a potential memory leak.

The present invention can be offered as a business method on a subscription or fee basis. For example, one or more components of the present invention can be created, maintained, supported, and/or deployed by a service provider that offers the functions described herein for customers. That is, a service provider can be used to provide light weight memory leak detection, as described above.

It should also be understood that the present invention can be realized in hardware, software, a propagated signal, or any combination thereof. Any kind of computer/server system(s)—or other apparatus adapted for carrying out the methods described herein—is suitable. A typical combination of hardware and software can include a general purpose computer system with a computer program that, when loaded and executed, carries out the respective methods described herein. Alternatively, a specific use computer, containing specialized hardware for carrying out one or more of the functional tasks of the invention, can be utilized. The present invention can also be embedded in a computer program product or a propagated signal, which comprises all the respective features enabling the implementation of the methods described herein, and which—when loaded in a computer system—is able to carry out these methods.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

The present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device), or a propagation medium. Examples of a computer-readable medium include a semiconductor or solid state memory, magnetic tape, removable computer diskette, random access memory (RAM), read-only memory (ROM), rigid magnetic disk and optical disk. Current examples of optical disks include a compact disk-read only disk (CD-ROM), a compact disk-read/write disk (CD-R/W), and a digital versatile disk (DVD).

Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A method for memory leak detection, comprising:
   obtaining raw free memory statistics;
   approximating free memory after garbage collection from the raw free memory statistics by:
      separating the raw free memory statistics into a plurality of periods, wherein each period includes possible garbage collection activity; and
      summarizing the raw free memory statistics in each period to a single data point, wherein the single data point approximates the free memory after garbage collection for that period; and
   analyzing the approximated free memory after garbage collection to identify a potential memory leak.

2. The method of claim 1, further comprising:
   performing at least one action to address the potential memory leak.

3. The method of claim 2, wherein the at least one action is performed automatically.

4. The method of claim 3, wherein the at least one action comprises:
   providing a notification of the potential memory leak.

5. The method of claim 3, wherein the at least one action comprises:
   taking heap dumps.

6. The method of claim 1, further comprising:
   separating the single data points for the plurality of periods into a plurality of longer periods; and
   analyzing the single data points in each of the longer periods for downward memory trends.

7. The method of claim 1, wherein the step of analyzing the approximated free memory after garbage collection to identify a potential memory leak further comprises:
   analyzing short and long periods of data corresponding to the approximated free memory after garbage collection to identify a potential memory leak.

8. A system, comprising at least one computer, for memory leak detection, comprising:
   a system for obtaining raw free memory statistics;
   a system for approximating free memory after garbage collection from the raw free memory statistic, the system for approximating comprising:
      a system for separating the raw free memory statistics into a plurality of periods, wherein each period includes possible garbage collection activity; and
      a system for summarizing the raw free memory statistics in each period to a single data point, wherein the single data point approximates the free memory after garbage collection for that period; and
   a system for analyzing the approximated free memory after garbage collection to identify a potential memory leak.

9. The system of claim 8, further comprising:
   a system for performing at least one action to address the potential memory leak.

10. The system of claim 9, wherein the at least one action is performed automatically.

11. The system of claim 10, wherein the at least one action comprises:
    providing a notification of the potential memory leak.

12. The system of claim 10, wherein the at least one action comprises:
    taking heap dumps.

13. The system of claim 8, further comprising:
    a system for separating the single data points for the plurality of periods into a plurality of longer periods; and
    a system for analyzing the single data points in each of the longer periods for downward memory trends.

14. The system of claim 8, wherein the system for analyzing the approximated free memory after garbage collection to identify a potential memory leak further comprises:
    a system for analyzing short and long periods of data corresponding to the approximated free memory after garbage collection to identify a potential memory leak.

* * * * *